(12) United States Patent
Nakamura

(10) Patent No.: US 8,077,215 B2
(45) Date of Patent: Dec. 13, 2011

(54) APPARATUS FOR DETECTING BLINKING STATE OF EYE

(75) Inventor: Tomokazu Nakamura, Kurokawa-gun (JP)

(73) Assignee: Fujifilm Corporation, Tokyo (JP)

( * ) Notice: Subject to any disclaimer, the term of this patent is extended or adjusted under 35 U.S.C. 154(b) by 738 days.

(21) Appl. No.: 12/101,766

(22) Filed: Apr. 11, 2008

(65) Prior Publication Data

US 2008/0252745 A1    Oct. 16, 2008

(30) Foreign Application Priority Data

Apr. 13, 2007  (JP) .................................. 2007-105580

(51) Int. Cl.
*H04N 5/235* (2006.01)
*G06K 9/00* (2006.01)
*G08B 23/00* (2006.01)

(52) U.S. Cl. ...................... 348/222.1; 382/117; 340/575

(58) Field of Classification Search ................ 348/222.1; 382/116–118; 340/436, 439, 575, 576
See application file for complete search history.

(56) References Cited

U.S. PATENT DOCUMENTS

| | | | | |
|---|---|---|---|---|
| 5,878,156 | A * | 3/1999 | Okumura | 382/118 |
| 6,571,002 | B1 * | 5/2003 | Ogawa | 382/117 |
| 7,202,792 | B2 * | 4/2007 | Zhang et al. | 340/575 |
| 2006/0204042 | A1 * | 9/2006 | Hammoud et al. | 382/107 |
| 2006/0210121 | A1 * | 9/2006 | Nakano et al. | 382/117 |
| 2007/0237421 | A1 * | 10/2007 | Luo et al. | 382/284 |

FOREIGN PATENT DOCUMENTS

| | | |
|---|---|---|
| JP | 2001-067459 A | 3/2001 |
| JP | 2003-338952 A | 11/2003 |
| JP | 2005-039365 A | 2/2005 |
| JP | 2006-163496 A | 6/2006 |

* cited by examiner

*Primary Examiner* — Trung Diep
(74) *Attorney, Agent, or Firm* — Sughrue Mion, PLLC

(57) ABSTRACT

A state-of-eye distinguishing means calculates a feature value that represents a state of an eye, for an eye-area based on pixel data of pixels that constitute the eye-area. A threshold value setting means calculates a first threshold value representing a feature value at a first transition point from an open state to a closed state and a second threshold value representing a feature value at a second transition point from the closed state to the open state, based on a feature value calculated for a targeted eye when the targeted eye is open. A blinking state detection means detects the blinking state of the eye corresponding to the eye-area, by sequentially comparing feature values which are sequentially calculated for a series of frame images by the state-of-eye distinguishing means with one of the first threshold value and the second threshold value.

16 Claims, 9 Drawing Sheets

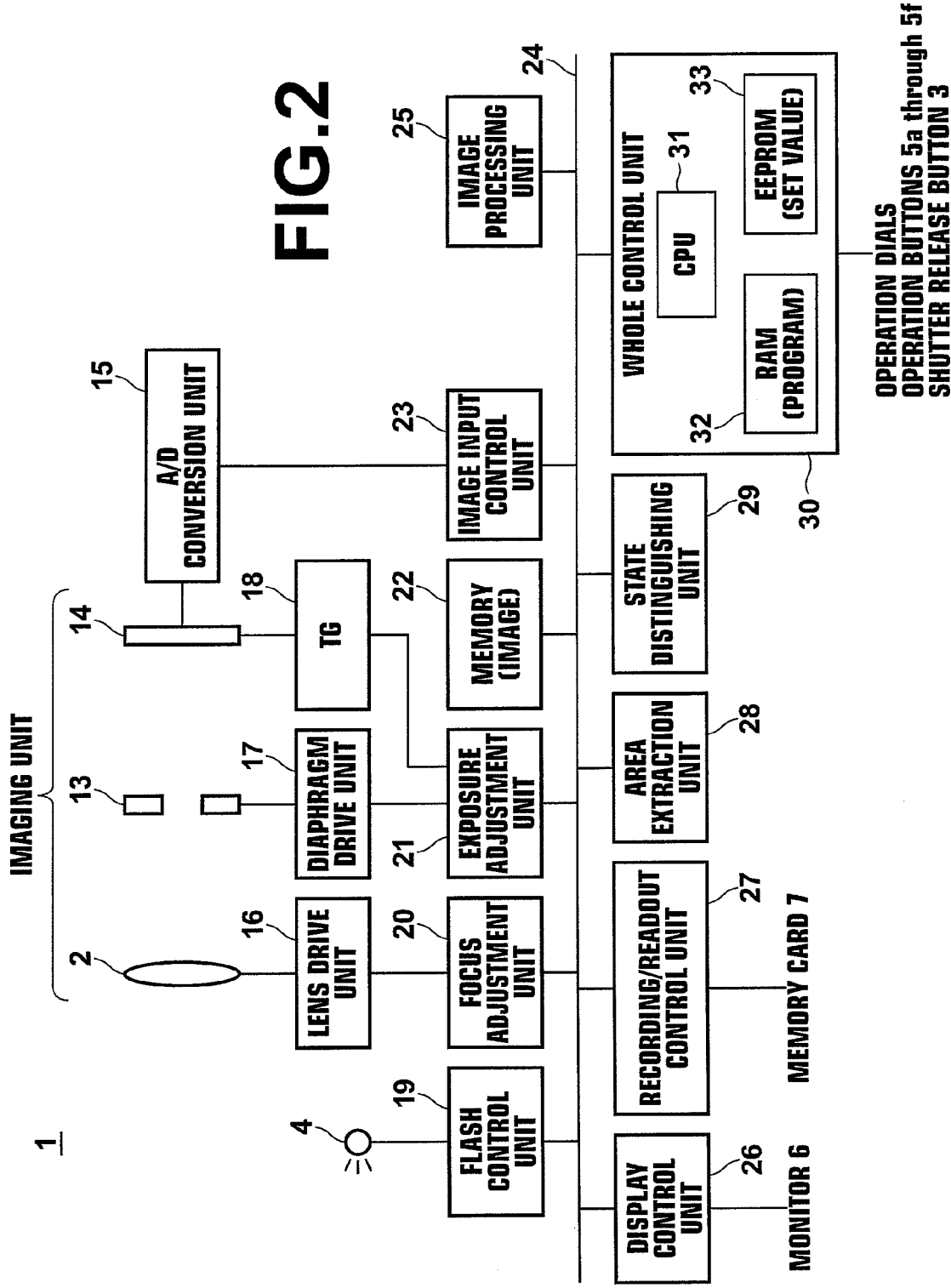

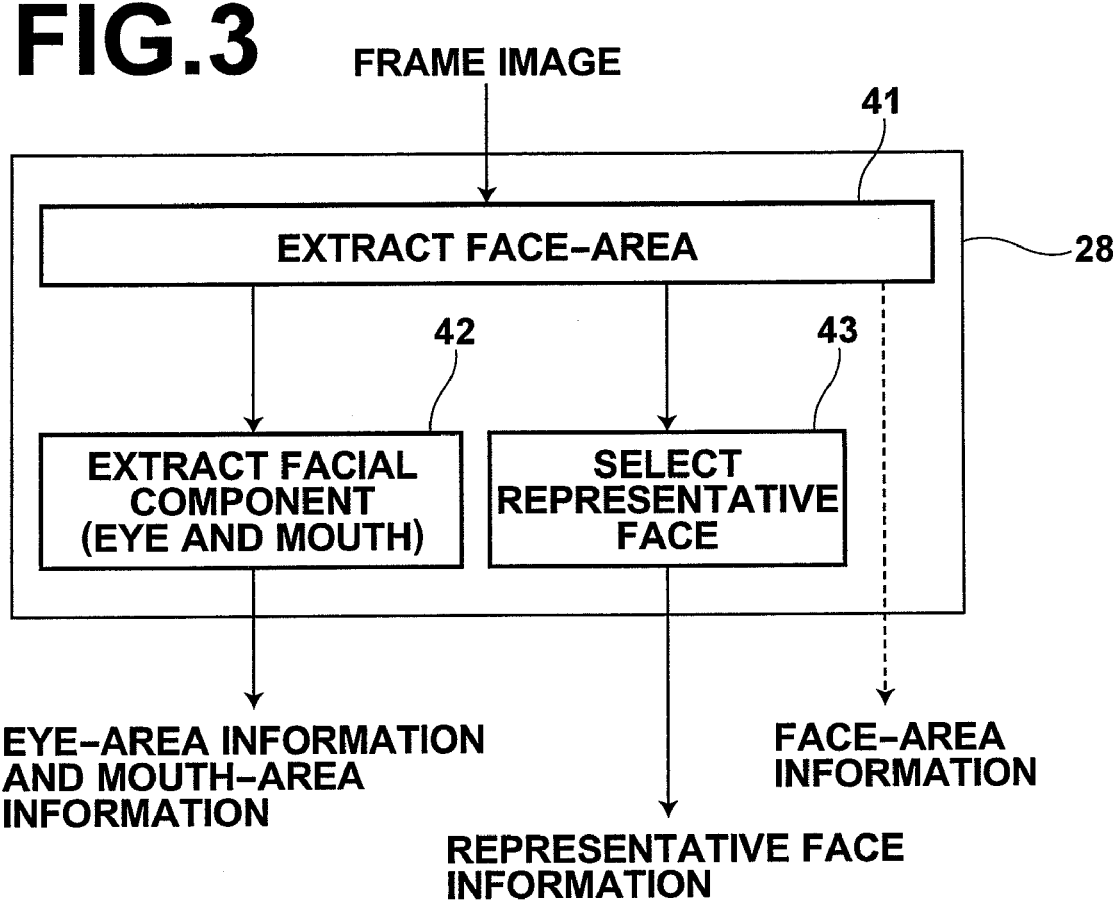
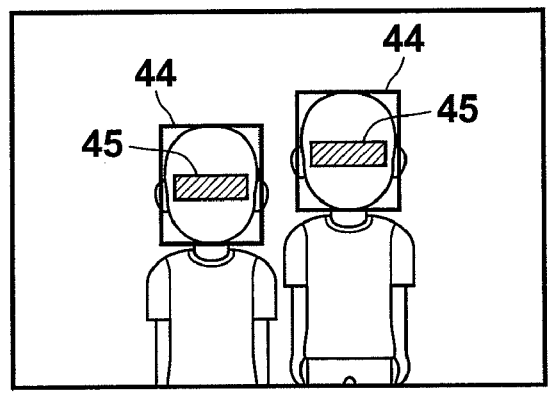

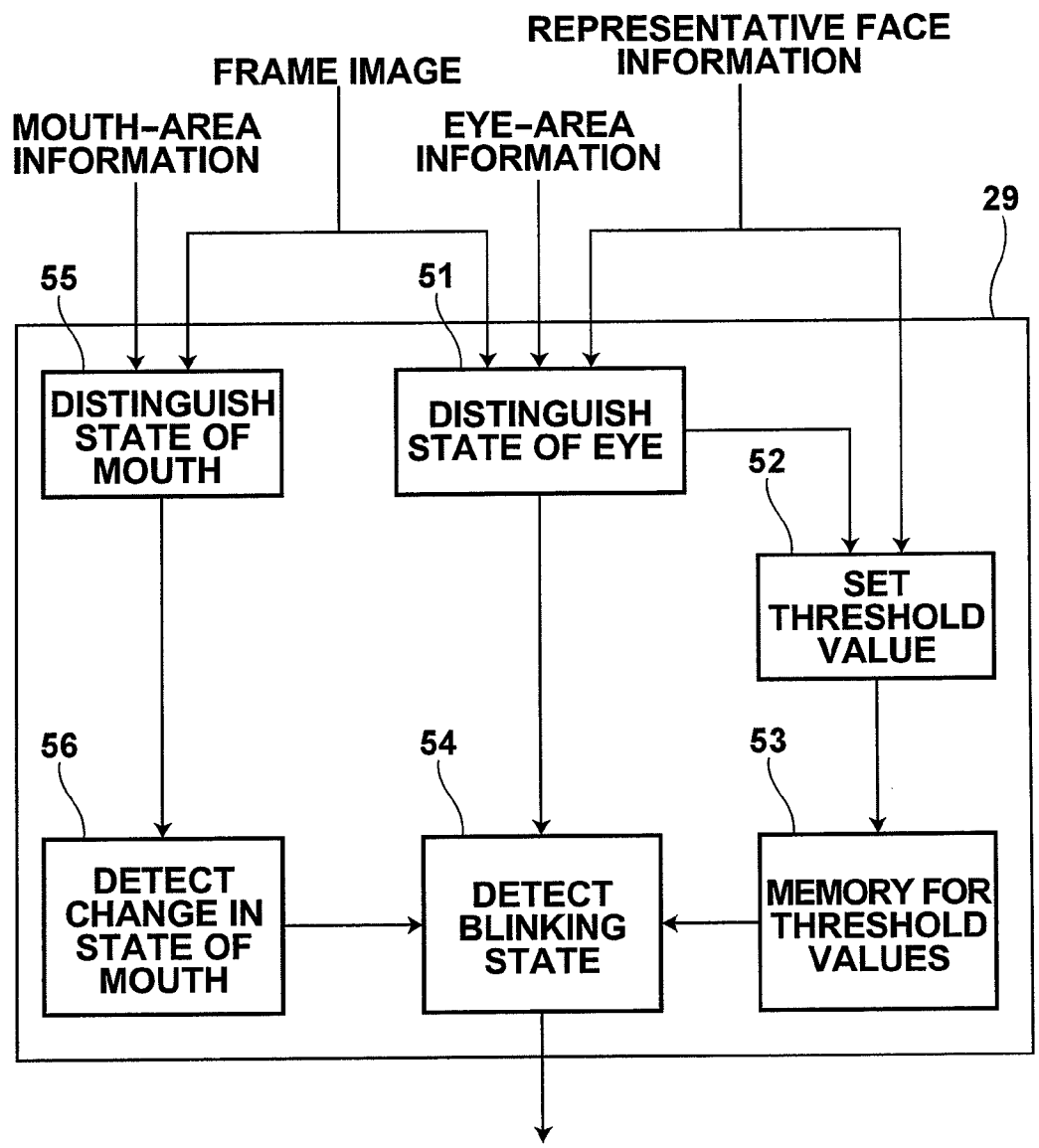

APPARATUS FOR DETECTING BLINKING STATE OF EYE

BACKGROUND OF THE INVENTION

1. Field of the Invention

The present invention relates to an apparatus for detecting a blinking state of an eye by using a series of frame images. Further, the present invention relates to a method, an imaging system and a recording medium on which a program has been stored that are used to carry out the method for detecting a blinking state of an eye.

2. Description of the Related Art

People normally blink. Therefore, it is not so easy to obtain a portrait of a person with open eyes. In particular, when many persons are photographed in the same picture, such as a group photograph, it is difficult to obtain a photograph that does not include a person with closed eyes. In photography of such a picture including many persons, even if a photographer judges the best timing of photography and tries to press the shutter release button of a camera while the photographer believes that everyone in the picture has open eyes, the obtained photograph often includes a person with closed eyes.

Some methods have been proposed to solve the aforementioned problem. For example, in Japanese Unexamined Patent Publication No. 2001-067459, as illustrated in FIG. 16 of the patent publication, a method for generating an image of a person with open eyes has been proposed. In the method, when a person in an image has closed eyes, images of eyes extracted from an image of the person with open eyes are synthesized to generate an image of the person with open eyes. Further, in the method proposed in Japanese Unexamined Patent Publication No. 2003-338952, the size of a pupil is monitored, and if an image including a small pupil is stored in a memory, the photographer is notified of such storage. Further, in the method proposed in Japanese Unexamined Patent Publication No. 2005-039365, a plurality of images are automatically obtained when a shutter release button is pressed and an image that includes a smallest number of persons with closed eyes is recorded. Further, in the method proposed in Japanese Unexamined Patent Publication No. 2006-163496, when images obtained by photography are recorded, the images are classified into images that include no person with closed eyes and images that include at least a person with closed eyes and recorded.

Each of the aforementioned patent literature discloses a method for judging a blinked state of an eye (a closed state) by comparing the amount of change in the radius of a pupil, the area of the pupil, the number of pixels of the pupil in the vertical direction or the like with a predetermined threshold value. However, the original size of a pupil and a distance between an upper eyelid and a lower eyelid when an eye is open vary from person to person. Therefore, if a fixed threshold value is used for comparison, a blinked state of an eye is not correctly detected in some cases. For example, if a person with small eyes (thin eyes) slightly narrows his/her eyes, the state may be judged as a blinked state.

Further, in some cases, even if there are many persons in a photography area, which can be captured by photography, the photographer wants to photograph only one person in the photography area. For example, when the photographer needs to obtain a snapshot of a particular person in a crowd, it is sufficient if the particular person does not blink during photography and blinking by the other persons in the crowd does not cause a problem. However, in the methods proposed in the aforementioned patent literature, it is impossible to limit the target of detection of a blinking state to a particular person.

SUMMARY OF THE INVENTION

In view of the foregoing circumstances, it is the first object of the present invention to eliminate a difference in the accuracy of detection of blinking states (states with a blink or blinks), the difference being caused by difference in eyes among individuals, and to make it possible to constantly detect a blinking state at high accuracy. Further, it is the second object of the present invention to make it possible to limit the target of detection of a blinking state to a particular person.

The present invention provides, as an apparatus that is used for detection of a blinking state of an eye (eyes), an apparatus including a state-of-eye distinguishing means, a threshold value setting means and a blinking state detection means, which will be described below.

The state-of-eye distinguishing means calculates a feature value that represents a state of an eye, for an eye-area which has been detected by searching a frame images. The feature value is calculated based on pixel data of pixels that constitute the eye-area.

The threshold value setting means calculates a first threshold value representing a feature value at a first transition point from an open state to a closed state and a second threshold value representing a feature value at a second transition point from the closed state to the open state. The threshold values are calculated based on the feature value calculated for a targeted eye when the targeted eye is open. The targeted eye is usually one of eyes of a main (most important) person in the frame image. Further, the threshold value setting means stores the calculated first threshold value and the calculated second threshold value in a memory.

For example, the feature value calculated for a targeted eye when the targeted eye is open, may be the highest value or the lowest value extracted from a plurality of values that have been calculated by the state-of-eye distinguishing means for a predetermined number of frame images including the targeted eye. If a feature value to be calculated is a value that increases as the eye is more widely open, the highest value should be extracted. If a feature value to be calculated is a value that decreases as the eye is more widely open, the lowest value should be extracted.

The blinking state detection means detects the blinking state of the eye corresponding to the eye-area, by sequentially comparing the feature values which are sequentially calculated for a series of frame images by the state-of-eye distinguishing means, with the first threshold value or the second threshold value which have been stored in the memory by the threshold value setting means.

In the apparatus of the present invention, a passage over the first transition point from the open state to the closed state is detected. Further, a passage over the second transition point from the closed state to the open state is detected. Therefore, in the present invention, it is possible to detect "blinking", which is a quick closing/opening action (movement) of an eye or eyes, at high accuracy. What is detected in the present invention is not a state in which the eye or eyes are closed. Further, since a threshold value that is used to judge the open/closed state is calculated based on the feature value calculated when the targeted eye is open, it is possible to detect a blinking state at high accuracy regardless of the size and the shape of the eye.

Further, it is desirable that the apparatus further includes a representative face selecting means for selecting one face-area from face-areas that have been detected by searching the frame images. For example, the representative face selecting means may select the face-area by using at least one of the position of the face-area, the size of the face-area, the degree of probability that the area is a face-area and the brightness of the face-area as a criterion (standard) for selection.

Further, when the apparatus includes the representative face selecting means, the threshold value setting means calculates the threshold values, regarding only the eye or eyes included in the face-area selected by the representative face selecting means as the targeted eye or eyes. Accordingly, it is possible to reduce the total calculation amount while accurately detecting blinking for a major face.

Further, processing may be performed in such a manner that detection of a blinking state is performed only when a facial expression is fixed. For performing detection in such a manner, a state-of-facial-component distinguishing means and a state change detection means may be provided for the apparatus. The state-of-facial-component distinguishing means distinguishes the state (shape, color or the like) of a facial component (facial part) other than the eyes, namely the mouth, the ear or ears, the eyebrow or eyebrows, the nose or the like. The state change detection means detects a change in the state of the facial component. Then, detection of a blinking state may be stopped while a change in the state of the facial component is detected.

Further, the state-of-facial-component distinguishing means may search a frame image for an area representing a facial component other than eyes and distinguish the state of the facial component, based on pixel data of pixels that constitute the area detected by searching for the facial component. Further, the state change detection means may detect a change in the state of the facial component based on the states of the facial component sequentially distinguished by the state-of-facial-component distinguishing means for a series of the frame images. For example, the state-of-facial-component distinguishing means may calculate the positions of a plurality of feature points of the facial component, and the state change detection means may detect a change in the position of each of the feature points in the series of frame images as a change in the state of the facial component.

Detection of a blinking state is performed mainly to prevent obtainment (recording) of an image including an eye in a blinking state. However, an image when the facial expression of a subject has changed is often worth obtaining regardless of whether the subject is blinking or not. Therefore, if detection of a blinking state is stopped while a change in the state of a facial component is detected, it is possible to obtain images while the facial expression of the subject is changing, regardless of whether the subject is blinking or not.

Further, it is desirable that the blinking state detection means operates only when an eye-area has been detected. Further, it is desirable that the state-of-eye distinguishing means searches only a predetermined search area for an eye-area. The search area is an area that has been estimated based on a face-area that has been detected by searching frame images for a face-area. If processing is performed in such a manner, it is possible to omit unnecessary calculations. Further, since searching is performed only for the minimum necessary area, it is possible to reduce the calculation amount and electric power consumption by the apparatus.

Further, the apparatus may further include a marking means and a display control means. The marking means generates a mark-synthesized image by synthesizing a mark image indicating a detection result by the blinking state detection means in the frame images. Further, the display control means outputs the mark-synthesized image generated by the marking means to a predetermined display device. If the apparatus includes the marking means and the display control means, a photographer can chose appropriate timing of obtaining (recording) an image by looking at the mark image displayed on the display device.

Further, when the apparatus includes the aforementioned representative face selecting means, the marking means may synthesize different mark images depending on whether a blinking state of an eye included in the face-area that has been selected by the representative face selecting means has been detected or a blinking state of an eye included in a face-area other than the face-area that has been selected by the representative face selecting means has been detected. If different marks are used for the representative face and the other faces, a photographer (user) who looks at the display can clearly recognize that the blinking state has been detected in the representative face.

Further, it is desirable that the apparatus includes a recording control means. The recording control means determines, based on a detection result output by the blinking state detection means, timing of recording the frame image or images in a predetermined recording medium and records the frame image or images in the predetermined recording medium at the determined timing. If the apparatus includes the representative face selecting means, it is desirable that the recording control means determines timing of recording the frame image or images so that the frame image or images are recorded when no blinking state of an eye or eyes included in the face-area selected by the representative face selecting means has become detected. If the apparatus includes the recording control means, it is possible to automatically obtain an image that does not include an eye in a blinking state without performing special user's operations.

Further, the present invention provides an imaging system including the aforementioned apparatus and an imaging apparatus for generating frame images representing a subject and for providing the frame images for the apparatus. One of the examples of such an imaging system is a digital camera including an image processing device and an imaging device. Further, a system in which a video camera is connected to a computer having an image processing function is another example of the imaging system.

Further, the present invention proposes a method for detecting a blinking state of an eye. The method for detecting a blinking state of an eye includes the steps of performing state-of-eye distinguishing processing, threshold value setting processing and blinking state detection processing. In the state-of-eye distinguishing processing, a predetermined feature value that represents a state of an eye, for an eye-area which has been detected by searching a frame image, based on pixel data of pixels that constitute the eye-area. In the threshold value setting processing, a first threshold value representing the feature value at a first transition point from an open state to a closed state and a second threshold value representing the feature value at a second transition point from the closed state to the open state are calculated based on the feature value calculated for a targeted eye when the targeted eye is open, and the calculated first threshold value and the calculated second threshold value are stored in a memory. In the blinking state detection processing, a blinking state of the eye corresponding to the eye-area, is detected by sequentially comparing the feature values that has been calculated for each of the frame images in the step of performing the state-of-eye distinguishing processing with one of the first threshold value and the second threshold value, which have been stored in the memory in the step of performing the threshold value setting processing.

Further, the present invention provides a program stored in a computer-readable recording medium, such as a CD-ROM and DVD, for detecting a blinking state. The program causes a computer to execute the procedure for distinguishing the state of an eye, the procedure for setting a threshold value and the procedure for detecting a blinking state.

Those who are skilled in the art would know that computer readable media are not limited to any specific type of device, and include, but are not limited to: floppy disks, CD's, RAM's, ROM's, hard disks, magnetic tapes and network media, in which computer instructions can be stored and/or transmitted. Transmission of the computer instructions through a wired or wireless network is also within the scope of this invention. Additionally, computer instructions include, but are not limited to: object and executable code, and can be in any language including higher level languages, assembly language, and machine language.

BRIEF DESCRIPTION OF THE DRAWINGS

FIG. 2 is a diagram illustrating the internal structure of the digital camera;

FIG. 3 is a diagram illustrating the configuration of an area extraction unit;

FIG. 4 is a diagram for explaining a search area for an eye-area;

FIG. 5 is a diagram illustrating the configuration of a state distinguishing unit;

DESCRIPTION OF THE PREFERRED EMBODIMENTS

Hereinafter, a digital camera that has a blinking state detection function, as an embodiment of a method and an apparatus according to the present invention, will be disclosed.
[Outline of Structure and Operation]

Figure 1A:
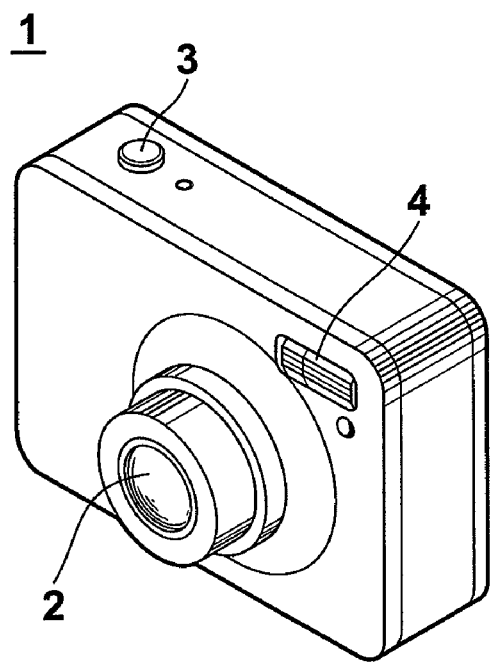
FIG. 1A is a diagram illustrating an external view (front view) of a digital camera as an embodiment of the present invention.
Figure 1B:
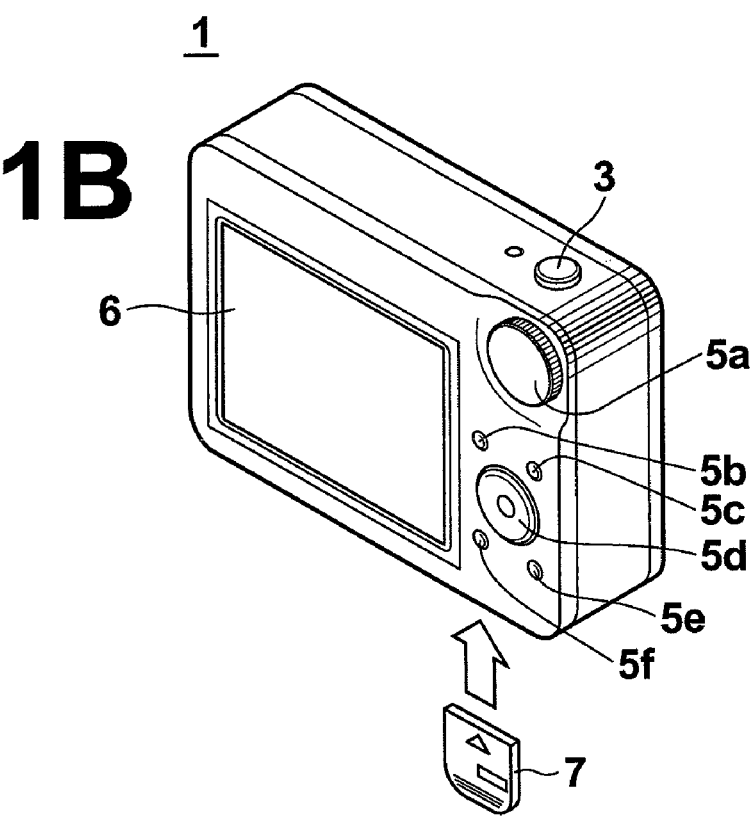
FIG. 1B is a diagram illustrating the external view (rear view) of the digital camera.

First, the structure of a digital camera will be described. FIGS. 1A and 1B are diagrams illustrating external views of a digital camera 1. FIG. 1A is a front view of the digital camera 1 and FIG. 1B is a rear view of the digital camera 1. As illustrated in FIGS. 1A and 1B, the digital camera 1 includes an imaging lens 2, a shutter release button 3, a flash (flash-light) 4, operation dials or buttons 5a through 5f and a monitor 6. Further, a slot cover (not illustrated) that can be opened and closed is provided at the lower portion of the digital camera 1, and a card slot for mounting a memory card 7 into the digital camera 1 is provided, the card slot being covered by the slot cover.

FIG. 2 is a diagram illustrating the internal structure of a digital camera 1. As illustrated in FIG. 2, the digital camera 1 includes an imaging unit, which includes the imaging lens 2, a lens drive unit 16, a diaphragm 13, a diaphragm drive unit 17, a CCD (charge coupled device) 14 and a timing generator (TG) 18. The imaging lens 2 includes a plurality of lenses, each having a different function from each other, such as a focus lens for focusing the digital camera 1 on a subject and a zoom lens for achieving a zoom function. The lens drive unit 16 is a small motor, such as a stepping motor. The lens drive unit 16 adjusts the position of each of the lenses having different functions from each other so that the distance between the CCD 14 and each of the lenses becomes an appropriate distance for their respective purposes. The diaphragm 13 is formed by a plurality of diaphragm wings (blades). The diaphragm drive unit 17 is a small motor, such as a stepping motor. The diaphragm drive unit 17 adjusts the positions of the diaphragm blades so that the aperture size of the diaphragm becomes appropriate for the purpose of photography. The CCD 14 has 5,000,000 to 12,000,000 pixels and a primary color filter is provided for the CCD 14. The CCD 14 outputs charges that have been stored therein based on instruction signals sent from the timing generator 18. The timing generator 18 sends the instruction signals to the CCD 14 so that the charges are stored in the CCD 14 only for a desired time period. Accordingly, the shutter speed is adjusted.

Further, the digital camera 1 includes an A/D conversion unit 15, an image input control unit 23 and a memory 22. The A/D conversion unit 15 converts signals that have been output from the CCD 14 to digital signals. The image input control unit 23 transfers image data that has been output from the A/D conversion unit 15 to other processing units through a system bus 24. The memory 22 temporarily stores the image data that has been transferred from the image input control unit 23.

Further, the digital camera 1 includes the flash 4, a flash control unit 19, a focus adjustment unit 20 and an exposure adjustment unit 21. The flash control unit 19 controls the light emission timing of the flash 4 and the amount of light emitted therefrom. The focus adjustment unit 20 adjusts focus by instructing the lens drive unit 16 to move the lens or lenses. The exposure adjustment unit 21 determines an aperture value and a shutter speed and sends instruction signals to the aperture drive unit 17 and the timing generator 18.

Further, the digital camera 1 includes an image processing unit 25 for performing imaging processing on the image data that is stored in the memory 22. The image processing unit 25 performs various kinds of finishing processing to improve the appearance and quality of the image obtained by photography. The finishing processing includes color gradation correction and brightness correction processing for obtaining an image that has natural colors and brightness, processing for changing so-called red eyes to normal black eyes when an image includes the red eyes and the like. Further, as will be described later, the image processing unit 25 performs processing on image data stored in the memory 22 so that a mark image indicating that blinking has been detected is synthesized. The image data that has been processed by the image processing unit 25 is stored in the memory 22 again.

Further, the digital camera 1 includes a display control unit 26. The display control unit 26 outputs the image data stored in the memory 22 to the monitor 6. The display control unit 26 performs thinning of pixels on the image data stored in the memory 22 so that the size of an image becomes appropriate for display and outputs the image data after thinning to a liquid crystal monitor 9. Further, the display control unit 26 controls the display of a setting screen for setting an operation condition or the like.

Further, the digital camera 1 includes a recording/readout control unit 27. The recording/readout control unit 27 controls processing for writing (recording) the image data stored in the memory 22 in a memory card 7 and processing for loading (storing) the image data recorded in the memory card 7 into the memory 22. The recording/readout control unit 27 records image data obtained by photography in the memory card 7. The image data obtained by photography is directly stored in the memory card 7 or stored in the memory card 7 after compressing and encoding the image data according to the setting by the user of the digital camera 1. The image data is recorded in the memory card 7 as an Exif (Exchangeable Image File Format) file. "Exif" is a file format standard that is defined by Japan Electronic Industry Development Association (JEIDA) Further, when regeneration of an image file that is recorded in the memory card 7 is requested, the recording/readout control unit 27 loads image data included in the Exif file into the memory 22. If the image data is compressed data, the image data is decompressed and loaded into the memory 22.

Further, the digital camera 1 includes an area extraction unit 28. The area extraction unit 28 searches the image data stored in the memory 22 for an area representing a face, an eye or eyes or other facial components and extracts the area. Here, it is assumed that the area extraction unit 28 extracts a face-area, an eye-area and a mouth-area and outputs area information representing each of the face-area, the eye-area and the mouth-area. If the image data includes a plurality of faces, the area extraction unit 28 outputs area information representing a face-area, an eye-area and a mouth-area for each of the faces.

Further, the digital camera 1 includes a state distinguishing unit 29. The state distinguishing unit 29 refers to the area information output by the area extraction unit 28 and calculates, based on the pixel values of the eye-area or the mouth-area represented by the area information, a feature value (characteristic value) representing the condition of an eye or a mouth. Then, the state distinguishing unit 29 distinguishes (identifies) the state of the eye or the mouth based on the calculated feature value. Further, the state distinguishing unit 29 detects a blinking state of an eye by monitoring a change in the distinguished state.

Further, the digital camera 1 includes a whole control unit 30. The whole control unit 30 includes a CPU (Central Processing Unit) 31, a RAM (Random Access Memory) 32 and an EEPROM (Electronically Erasable and Programmable Read Only Memory) 33. The RAM 32 is a memory in which an operation/control program is stored, and the EEPROM 33 is a memory in which various set values are stored. The CPU 31 of the whole control unit 30 refers to the set values stored in the EEPROM 33 and selects and executes the program stored in the RAM 32 based on the set values. Accordingly, the whole control unit 30 detects operation of the shutter release button 3 and operation of the operation dials/buttons 5a through 5f or receives the result of processing by each of the processing units. Then, the whole control unit 30 sends instruction signals for instructing processing to be performed to the flash control unit 19, the focus adjustment unit 20, the exposure adjustment unit 21, the image input control unit 23, the image processing unit 25, the display control unit 26, the recording/readout control unit 27, the area extraction unit 38 and the state distinguishing unit 29. Accordingly, the operation of the digital camera 1 is controlled.

In the present embodiment, the digital camera 1 has a photography mode, an image generation mode and a setting mode, as its operation modes. When the digital camera 1 is set to the photography mode, the imaging unit starts generation of image data representing a subject. The generated image data is sequentially recorded in the memory. Meanwhile, the display control unit sequentially outputs the image data recorded in the memory to the monitor. Accordingly, a dynamic image (video image) of the subject is displayed on the monitor 6. When the whole control unit detects pressing of the shutter release button 3, processing for focus adjustment, exposure control and flash control is performed under control by the whole control unit 30. At this time, the image processing unit performs necessary processing on the image data generated by the imaging unit. Then, the image data is stored in the memory card 7 through the control operation by the recording/readout control unit 27.

Further, if the digital camera 1 is set to the image regeneration mode, images recorded in the memory card 7 are loaded into the memory 22 under control by the whole control unit 30. Then, the image data is output to the monitor 6 through the control operation by the display control unit 26. Further, if the digital camera 1 is set to the setting mode, a setting screen is displayed on the monitor 6 under control by the whole control unit 30. Then, inputs for operation by a user are received from the operation dials/buttons 5a through 5f. Information selected by the user in the setting screen by using the operation dials/buttons 5a through 5f is stored in the EEPROM 33. The various kinds of set values stored in the EEPROM 33 are referred to when the digital camera 1 is switched to the photography mode or the regeneration mode, and each of the processing units is controlled by the whole control unit 30 so that the set operation is performed.

[Blinking state Detection Function]

Hereinafter, a blinking state detection function of the digital camera 1 will be further described. The blinking state detection function becomes active when the blinking state detection function is turned ON (set to ON) at the setting screen. A blinking state detection flag is stored in the EEPROM 33. The value of the blinking state detection flag is set to 1 when the blinking state detection function is ON. The value of the blinking state detection flag is set to 0 when the blinking state detection function is OFF. The whole control unit 30 refers to the blinking state detection flag when the mode is switched to the photography mode. If the flag is set to 1, the whole control unit 30 sends instruction signals for instructing necessary processing for detecting a blinking state to the area extraction unit 28 and the state distinguishing unit 29.

FIG. 3 is a diagram illustrating the structure of the area extraction unit 28. As illustrated in FIG. 3, the area extraction unit 28 includes a face-area extraction means 41, a facial-component-area extraction means 42 and a representative face selecting means 43. The area extraction unit 28 may be a circuit formed by an LSI (large-scale integration) circuit that functions as the face-area extraction means 41, the facial-component-area extraction means 42 and the representative face selecting means 43. Alternatively, the area extraction unit 28 may be a microcomputer in which a software program for executing the processing of the face-area extraction means 41, the facial-component-area extraction means 42 and the representative face selecting means 43 is installed.

When the digital camera 1 is set to the photography mode and the image data generated by the imaging unit becomes sequentially stored in the memory 22, the face-area extraction means 41 reads out the image data stored in the memory 22 and searches each frame for a face-area representing a face. As methods for extracting the face-area, a method for detecting a flesh color area and other well-known methods may be used. If the face-area extraction means 41 detects a face-area, the face-area extraction means 41 outputs a coordinate value representing the position of the face in the frame (gravity position or the like), a value representing the size (diameter or area) of the face and a value representing the degree of probability that the area is a face-area (probability that the area is a true face-area), as face-area information.

As the value representing the degree of probability that the area is a face-area, an evaluation value of the likelihood that an image is a face is output. The evaluation value is calculated to judge whether the image is a face. Alternatively, a difference value (a differential) between the evaluation value and a threshold value, which is a criterion for judgment, is output. In judgment of the face-area, normally, the evaluation value of the likelihood that the image is a face, which has been calculated from pixel data representing the image area, is compared with a predetermined threshold value. Then, judgment as to whether the area represents a face is made based on the comparison result. If the evaluation value even slightly exceeds the threshold value, the area is judged as an area representing a face. The likelihood that the image is a face is lower if the evaluation value is closer to the threshold value. If the evaluation value significantly exceeds the threshold value, the likelihood is higher. Therefore, the evaluation value that has been calculated to be used for judgment and the difference value between the evaluation value and the threshold value may be used as an index representing the degree of probability that the area is a face-area.

If a plurality of face-areas are detected, the face-area extraction means 41 outputs face-area information for each of the faces. If no face-area is detected, the face-area extraction means 41 outputs a value (for example, "0") representing that no face has been detected, as the face-area information.

The facial-component-area extraction means 42 refers to the face-area information output by the face-area extraction means 41. First, the facial-component-area extraction means 42 roughly selects, based on the position, size, color or the like of the face-area, a range (area) in which an eye or eyes or a mouth is present. For example, if a search area for an eye-area should be selected, a range 45 for searching, as illustrated in FIG. 4, is selected. The range 45 for searching is an area slightly above the center of a face-area 44, namely a partial area of the face-area 44, the vertical length of the partial area being approximately ¼ of the total vertical length of the face-area 44, and the horizontal length of the partial area being substantially the same as (or slightly narrower than) the horizontal width of the face-area 44. Alternatively, binary processing may be performed on the image in the face-area 44. If the binary processing is performed, an image in which only facial components that are not flesh-colored, such as pupils and mouths, are displayed in black is obtained. Therefore, an area in the vicinity of the black area obtained by the binary processing is extracted, and the extracted area may be used as the range for searching.

After the facial-component-area extraction means 42 selects the search range, the facial-component-area extraction means 42 performs more accurate detection processing in the range. For example, the facial-component-area extraction means 42 may distinguish (identify) an eye or eyes or a mouth by utilizing classification algorithm based on learning, such as Adaboost algorithm. Alternatively, the facial-component-area extraction means 42 may use any kind of well-known method to identify the eye or eyes or the mouth. If an eye-area is detected by searching, the facial-component-area extraction means 42 outputs eye-area information representing the range of the eye-area in the frame. If a plurality of face-areas have been detected and each of the face-areas has been searched for an eye-area, a plurality of sets of eye-area information are output. If no eye-area is detected, a value (for example, "0") representing that no eye-area has been detected is output as the eye-area information. Further, if a mouth-area has been detected, mouth-area information representing the range of the mouth-area in the frame is output together with the eye-area information. If no mouth-area is detected, a value (for example, "0") representing that no mouth-area has been detected is output as the mouth-area information in a manner similar to the output of the eye-area information.

The eye-area and the mouth-area may be detected by directly searching the whole frame for the eye-area and the mouth-area. However, if the frame is searched for a face-area first and only the face-area is searched for an eye-area or a mouth-area, as described above, searching can be performed more efficiently. Further, it is possible to accurately detect the eye-area and the mouth-area. Further, if a range (area) in which the eye-area or the mouth-area is likely to be present is estimated in advance and searching is performed only for the estimated range, it is possible to improve the efficiency of searching.

The representative face selecting means 43 selects, based on the face-area information output by the face-area extraction means 41, a representative face and outputs representative face information that specifies the selected face. If only one face is detected in a frame, the detected face is selected as a representative face. If a plurality of faces are detected in a frame, a representative face is selected, based on face-area information or a value that can be calculated by utilizing the face-area information, from the plurality of faces. Further, a criterion for selecting a representative face may be arbitrarily determined. For example, the coordinate of the position of each of faces, which is included in each set of face-area information, is referred to and a face-area, the coordinate of which represents a position that is the closest to the center of the frame, is selected as the representative face. Alternatively, information about the size of a face included in each set of face-area information is referred to and a face that has the largest diameter or area is selected as the representative face. Alternatively, information about the degree of probability that the image is a face included in each set of face-area information is referred to and a face-area that has the highest degree of probability is selected as the representative face. Alternatively, RGB-YCC conversion processing is performed on image data that has been read in from the memory 22 to obtain a brightness image. Then, the brightness of a face-area (such as, the highest brightness and the average brightness) is calculated and a face-area that has the highest brightness is selected from the plurality of face-areas.

Further, these criteria for selection may be used in combination. For example, points with respect to the arrangement position, the size, the degree of probability and the brightness of each of face-areas are assigned to each of the face-areas. For example, with respect to the arrangement position, a higher point is assigned as the position is closer to the center of the face-area. In this case, higher weight may be given to the point of an element that the user wishes to emphasize. The points assigned to the arrangement position, the size, the degree of probability and the brightness are added together. Then, a face-area, the total point of which is the highest among the face-areas, is selected as a representative face.

The eye-area information and the mouth-area information output by the facial-composition-area extraction means 42 and the representative face information output by the representative face selecting means 43 are provided for the state distinguishing unit 29 by the area extraction unit 28. Further, the representative face information is provided for the focus adjustment unit 20, the exposure adjustment unit 21 and the image processing unit 25. The face-area information output by the face-area extraction means 41 is provided for the focus adjustment unit 20 and the exposure adjustment unit 21. The focus adjustment unit 20 and the exposure adjustment unit 21 control the imaging unit by utilizing the face-area information and the representative face information that have been provided so that the imaging unit is focused on the face and that the face-area becomes sufficiently bright.

FIG. 5 is a diagram illustrating the configuration of the state distinguishing unit 29. The eye-area information, the mouth-area information and the representative face information are provided for the state distinguishing unit 29 by the area extraction unit 28. The state distinguishing unit 29 includes a state-of-eye distinguishing means 51, a threshold value setting means 52, a memory 53 for threshold values, a blinking state detection means 54, a state-of-mouth distinguishing means 55 and a state-of-mouth change detection means 56. The state distinguishing unit 29 may be formed by a circuit including LSI's (large-scale integrated circuits) functioning as the aforementioned means and a memory having predetermined capacity. Alternatively, the state distinguishing unit 29 may be formed by a microcomputer in which a program for causing a computer to execute the processing of each of the aforementioned means has been installed.

The state-of-eye distinguishing means 51 is controlled by the whole control unit 30 and reads in image data from the memory 22 in synchronization with the area extraction unit 28. Then, the state-of-eye distinguishing means 51 waits until the eye-area information is provided by the area extraction unit 28 and calculates a feature value representing a state of an eye based on image data forming the eye-area. If a plurality of eye-areas are present, a feature value for each of the plurality of eye-areas is calculated. However, the operation of the state-of-eye distinguishing means 51 is stopped while the value "0", which is a value representing that no eye-area has been detected, is provided as the eye-area information. While the operation of the state-of-eye distinguishing means 51 is stopped, the operation of the blinking state detection means 54 is also stopped.

Figure 6:
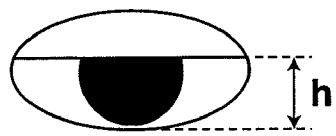
FIG. 6 is a diagram illustrating an example of a feature value representing a state of an eye.

In the present embodiment, the height h (vertical length) of a portion of a pupil, the portion appearing in the image as illustrated in FIG. 6, is calculated as a feature value representing a state of the eye. The value h to be calculated may be the number of pixels. Alternatively, the value h may be a distance in a predetermined coordinate system. After the state-of-eye distinguishing means 51 finished calculation of the value h for each of all the eyes included in one frame, the state-of-eye distinguishing means 51 provides the calculated values for the threshold value setting means 52 and the blinking state detection means 54. If a plurality of eye-areas are present, an identifier or the like for distinguishing each eye is attached to the value h for each eye and the value h for each eye is output.

The state-of-eye distinguishing means 51 repeats the aforementioned processing for each frame. Therefore, the value h for each eye, which has been sequentially calculated for each of temporarily sequential images, is continuously input to the threshold value setting means 52 and the blinking state detection means 54.

Figure 7:
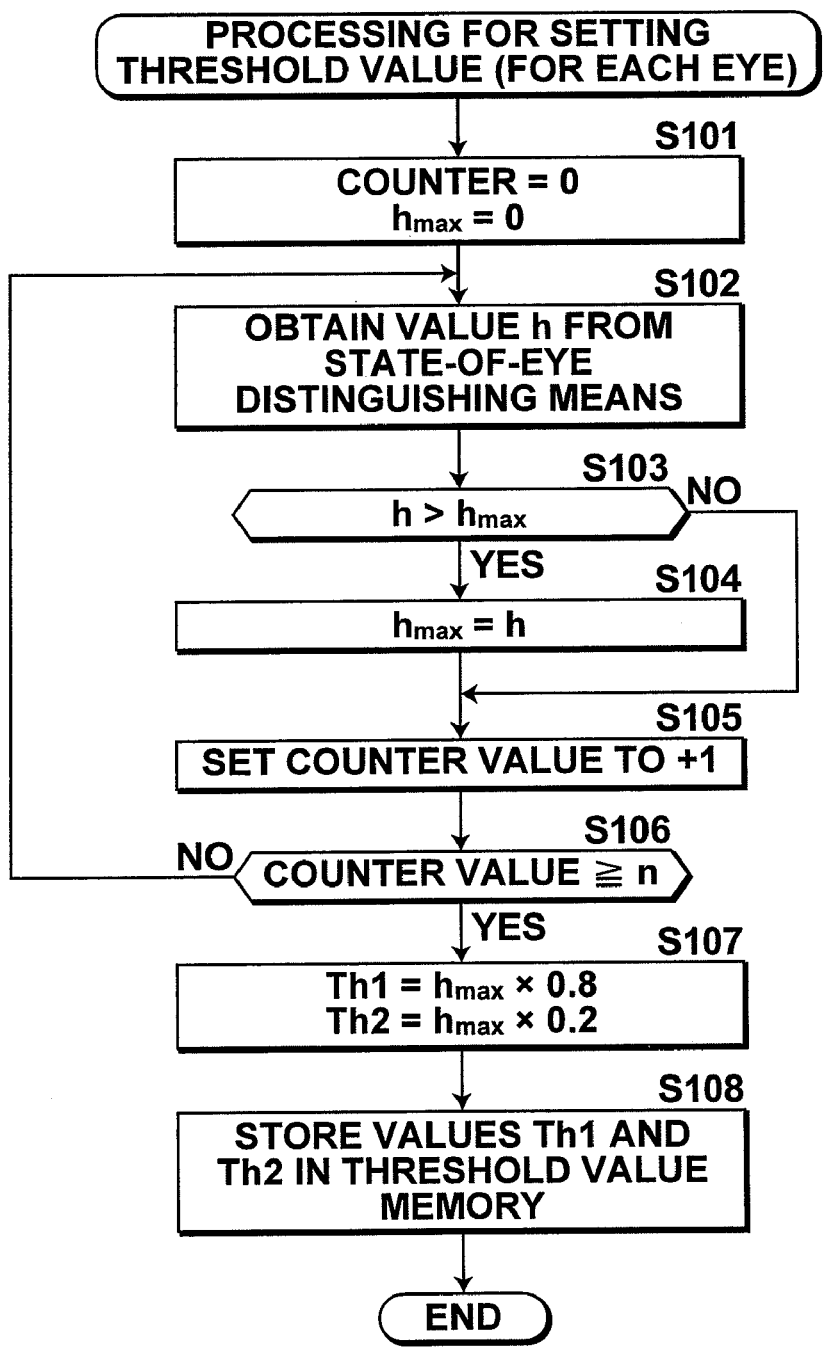
FIG. 7 is a flow chart illustrating an example of processing performed by a threshold value setting means.

FIG. 7 is a flow chart illustrating an example of processing performed by the threshold value setting means 52. The threshold value setting means 52 performs the following processing for each eye. First, the threshold value setting means 52 initializes the counter value to "0" and sets a temporary value "0" as the value of a processing variable $h_{max}$ (step S101). Then, the threshold value setting means 52 obtains a value h that has been calculated by the state-of-eye distinguishing means 51 for a frame at certain time (step S102). The threshold value setting means 52 compares the obtained value h with the processing variable $h_{max}$ (step S103). If the value h is higher than the processing variable $h_{max}$, the value of the processing variable $h_{max}$ is replaced by the value h (step S104). If the value h is less than or equal to the processing variable $h_{max}$, the value of the processing variable $h_{max}$ is not replaced.

Then, a value "1" is added to the counter value (step S105). Thereafter, processing goes back to step S102 and the threshold value setting means 52 obtains a value h that has been calculated by the state-of-eye distinguishing means 51 for the next frame. Then, the threshold value setting means 52 performs processing of steps S103, S104 and S105 for the obtained value h. Similarly, processing of steps S102 through S105 is repeated until the counter value reaches a predetermined value n (for example, 100) (step S106). The highest value of the value h is set as the processing variable $h_{max}$ by performing the processing that has been described above.

Then, the threshold value setting means 52 uses the value $h_{max}$ and calculates a value representing the height of a portion of a pupil at a transition point from an open state of an eye to a closed state of the eye, the portion appearing in the image. Further, the threshold value setting means 52 uses the value $h_{max}$ and calculates a value representing the height of a portion of a pupil at a transition point from a closed state of an eye to an open state of the eye, the portion appearing in the image (step S107). Specifically, the threshold value setting means 52 calculates a threshold value Th1, which is used as a criterion for judging whether the state of an eye has changed from an open state to a closed state. Further, the threshold value setting means 52 calculates a threshold value Th2, which is used as a criterion for judging whether the state of an eye has changed from a closed state to an open state.

Figure 8:
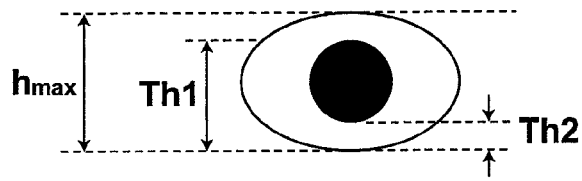
FIG. 8 is a diagram for explaining a method for calculating a threshold value.

FIG. 8 is a diagram illustrating the relationship among the value $h_{max}$ and the threshold values Th1 and Th2. As illustrated in FIGS. 7 and 8, in the present embodiment, the value of the threshold value Th1 is set to a value that is 80% of the value $h_{max}$ and the value of the threshold value Th2 is set to a value that is 20% of the value $h_{max}$. However, the relationship among the value $h_{max}$ and the threshold values Th1 and Th2 is not limited to the aforementioned relationship. For example, the value of each of the threshold values Th1 and Th2 may be set to a value that is 50% of the value $h_{max}$. The calculated threshold values Th1 and Th2 are stored in the memory 53 for threshold values together with an identifier for distinguishing (identifying) the eye (step S108).

Figure 9:
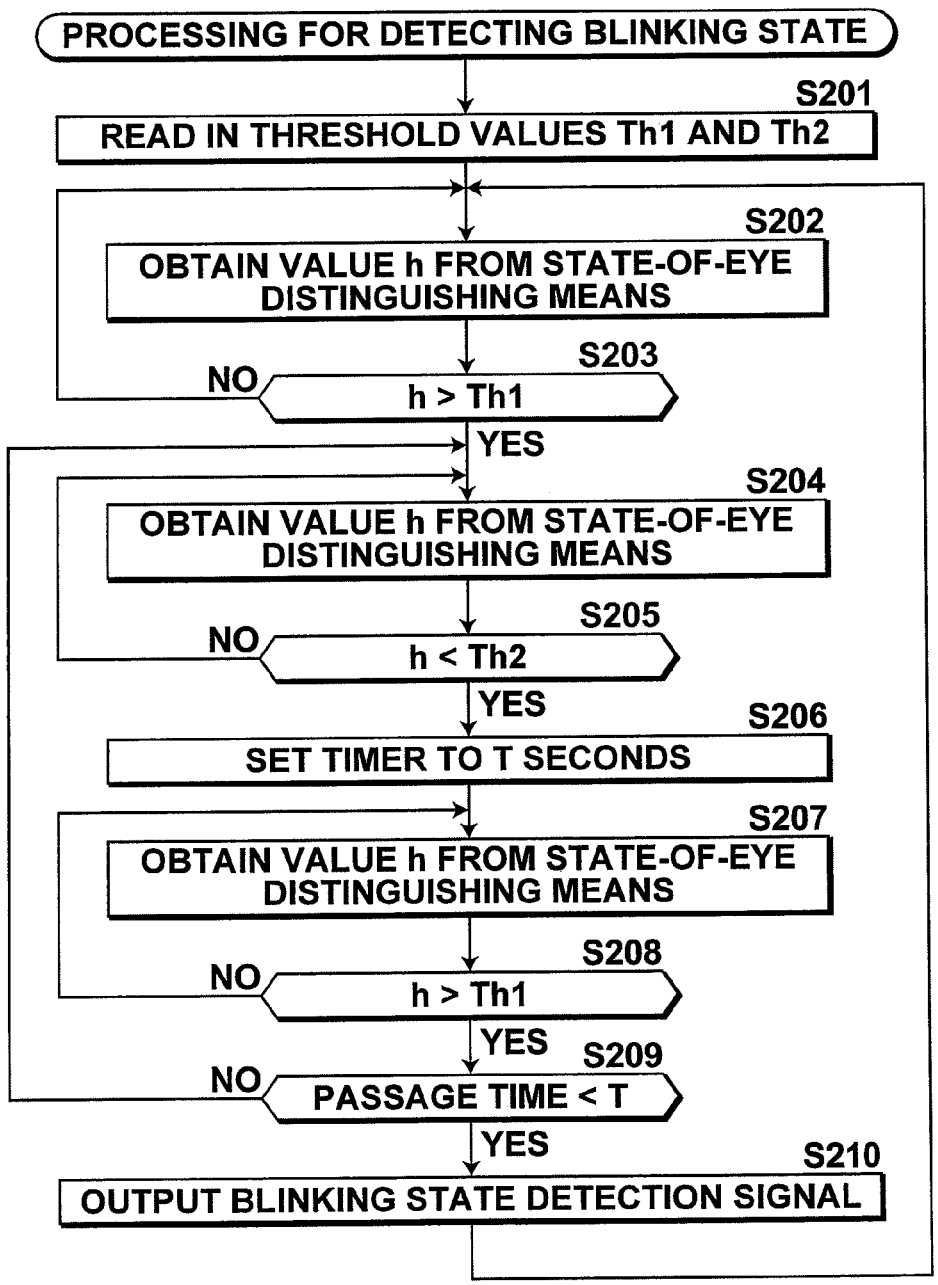
FIG. 9 is a flow chart illustrating an example of processing performed by the blinking state detection means.

FIG. 9 is a flow chart illustrating an example of the processing performed by the blinking state detection means 54. The blinking state detection means 54 performs the following processing for each eye. In the present embodiment, the blinking state detection means 54 does not detect a closed eye (an eye in a closed state) but an action of quickly closing and opening an eye.

The blinking state detection means 54 reads in the threshold values Th1 and Th2 for one eye from the memory 53 for threshold values (step S201). Then, the blinking state detection means 54 obtains a value h that has been calculated by the state-of-eye distinguishing means 51 for a frame at certain time (step S202). The blinking state detection means 54 compares the obtained value h with the threshold value Th1 (step S203). If the value h is less than or equal to the threshold value Th1, processing returns to step S202. In step S202, a value h that has been calculated by the state-of-eye distinguishing means 51 for a frame next to the aforementioned frame is obtained. Then, the comparison in step S203 is performed again. Then, this processing is repeated until a judgment result that the value h has exceeded the threshold value Th1 is obtained in step S203. In other words, this processing is repeated until an open state of an eye is detected.

Then, the blinking state detection means 54 obtains a value h that has been calculated by the state-of-eye distinguishing means 51 for a frame next to the frame in which the eye in an open state has been detected (step S204). The blinking state detection means 54 compares the obtained value h with the threshold value Th2 (step S205). If the value h is greater than or equal to the threshold value Th2, the processing returns to step S204. In step S204, the blinking state detection means 54 obtains a value h calculated by the state-of-eye distinguishing means 51 for a frame next to the aforementioned frame. Then, comparison is performed again in step S205. Then, this processing is repeated until a judgment result that the value h obtained in step S205 is less than the threshold value Th2 is obtained. In other words, this processing is repeated until a closed state of an eye is detected.

Then, the blinking state detection means 54 sets a timer to predetermined time T (step S206). When people blink unintentionally, their eyes are closed approximately for 0.5 second at longest. When they blink intentionally, their eyes are closed for a longer time period, namely approximately for 0.5 to 3 seconds. Therefore, it is desirable that time T is approximately in the range of 1 to 3 seconds.

After the blinking state detection means 54 sets the timer, the blinking state detection means 54 obtains a value h that has been calculated by the state-of-eye distinguishing means 51 for the next frame (step S207). The obtained value h is compared with the threshold value Th1 (step S208). If the value h is less than or equal to the threshold value Th1, processing returns to step S207. In step S207, the blinking state detection means 54 obtains a value h calculated by the state-of-eye distinguishing means 51 for a frame next to the aforementioned frame. Then, comparison is performed again in step S208. Then, this processing is repeated until a judgment result that the obtained value h has exceeded the threshold value Th1 is obtained in step S208. In other words, this processing is repeated until an open state of an eye is detected.

If an open state of an eye is detected in step S208, judgment is made as to whether a time that has passed after setting the timer is greater than or equal to time T by referring to the value of the timer (step S209). If the eye is closed for the time T or longer, it is judged that the movement (action) of the eye is not blinking. In this case, the blinking state detection means 54 returns to step S204 and the aforementioned processing is repeated. If the time that has passed after setting the timer is less than the time T, the blinking state detection means 54 judges that the action of the eye is blinking and outputs a signal (hereinafter, referred to as a blinking state detection signal) indicating that a blinking state has been detected (step S210). If a plurality of eye-areas are present, a blinking state detection signal to which an identifier for identifying each of the eyes (distinguishing the eyes from each other) has been attached is output. The blinking state detection signal output by the blinking state detection means 54 is sent from the state distinguishing unit 29 to the image processing unit 25 and the recording/readout control unit 27. After the blinking state detection means 54 outputs a blinking state detection signal, processing goes back to step S202. Then, processing till S210 is repeated.

As described above, in judgment of a blinking state, a blinking action of an eye is identified (detected) by repeatedly comparing a feature value that has been calculated based on an eye-area with two threshold values Th1 and Th2 for a plurality of frames that are provided in time series. If the blinking state is identified in such a manner, the blinking action can be accurately detected. Further, since the threshold values Th1 and Th2 are set for each eye, optimum judgment can be made regardless of the size of the eye. Therefore, an error in detection caused by individual differences can be prevented.

Generally, photography of a blinking state should be prevented. However, there are cases in which it is desirable to photograph a blinking state as it is. For example, if a person blinks while changing his/her facial expression, such as blinking by being surprised, the blinking may be worth photographing. Therefore, the blinking state detection means 54 does not perform the processing illustrated in the flow chart of FIG. 9 while the facial expression of a subject is significantly changing. When a plurality of faces are present, if only a part of the plurality of faces is significantly changing, the processing in FIG. 9 is performed on the faces (eye or eyes) other than the part of the plurality of faces.

Next, processing by the state-of-mouth distinguishing means 55 and the state-of-mouth change detection means 56, which are means for detecting a change in facial expression, will be described. The state-of-mouth distinguishing means 55 reads in image data from the memory 22 in synchronization with the area extraction unit 28, while being controlled by the whole control unit 30. Then, the state-of-mouth distinguishing means 55 waits until mouth-area information is provided by the area extraction unit 28 and performs processing for distinguishing the state of a mouth for each frame.

Figure 10A:
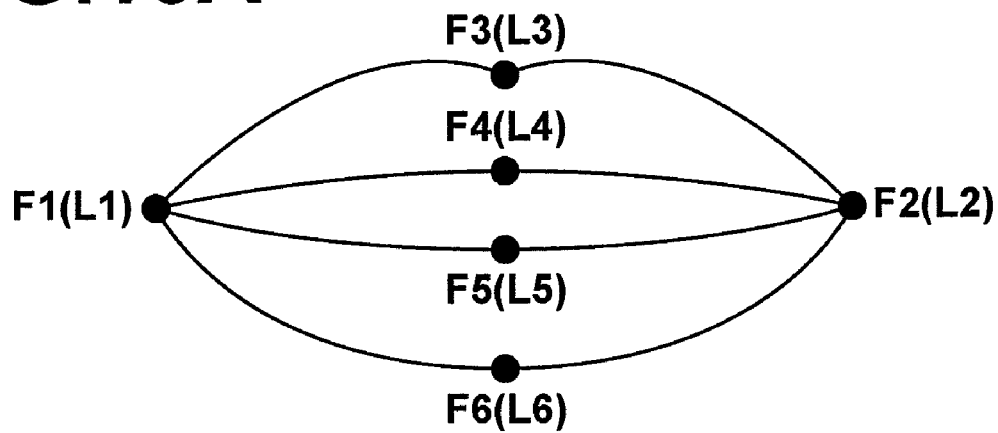
FIG. 10A is a diagram for explaining about information provided for a state-of-mouth change detection means.
Figure 10B:
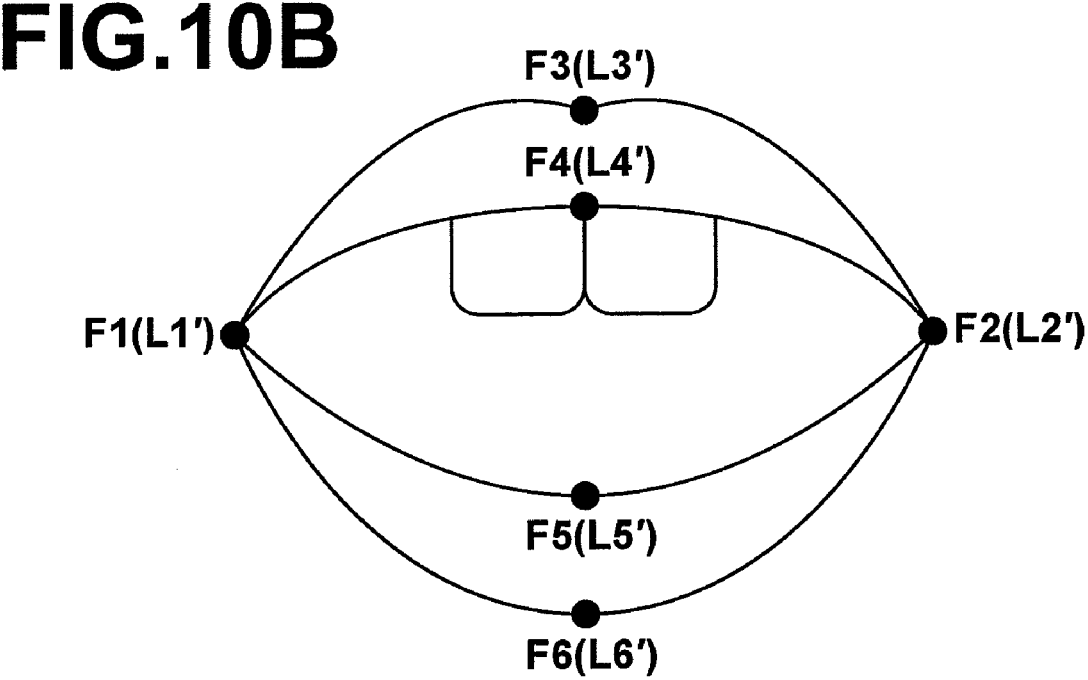
FIG. 10B is a diagram for explaining about information provided for the state-of-mouth change detection means.

The state-of-mouth distinguishing means 55 calculates the coordinate of the position of each of a plurality of feature points, which characterize the shape of the mouth. For example, as illustrated in FIGS. 10A and 10B, six points, namely a left mouth corner, a right mouth corner, the upper end of the center of an upper lip, the lower end of the center of the upper lip, the upper end of the center of a lower lip and the lower end of the center of the lower lip, are determined as the feature points F1 through F6 of a mouth. The state-of-mouth distinguishing means 55 distinguishes feature points F1 through F6 in an image of a mouth-area. Then, the state-of-mouth distinguishing means 55 provides a coordinate value representing the position of each of the feature points F1 through F6 for the state-of-mouth change detection means 56.

Figure 11:
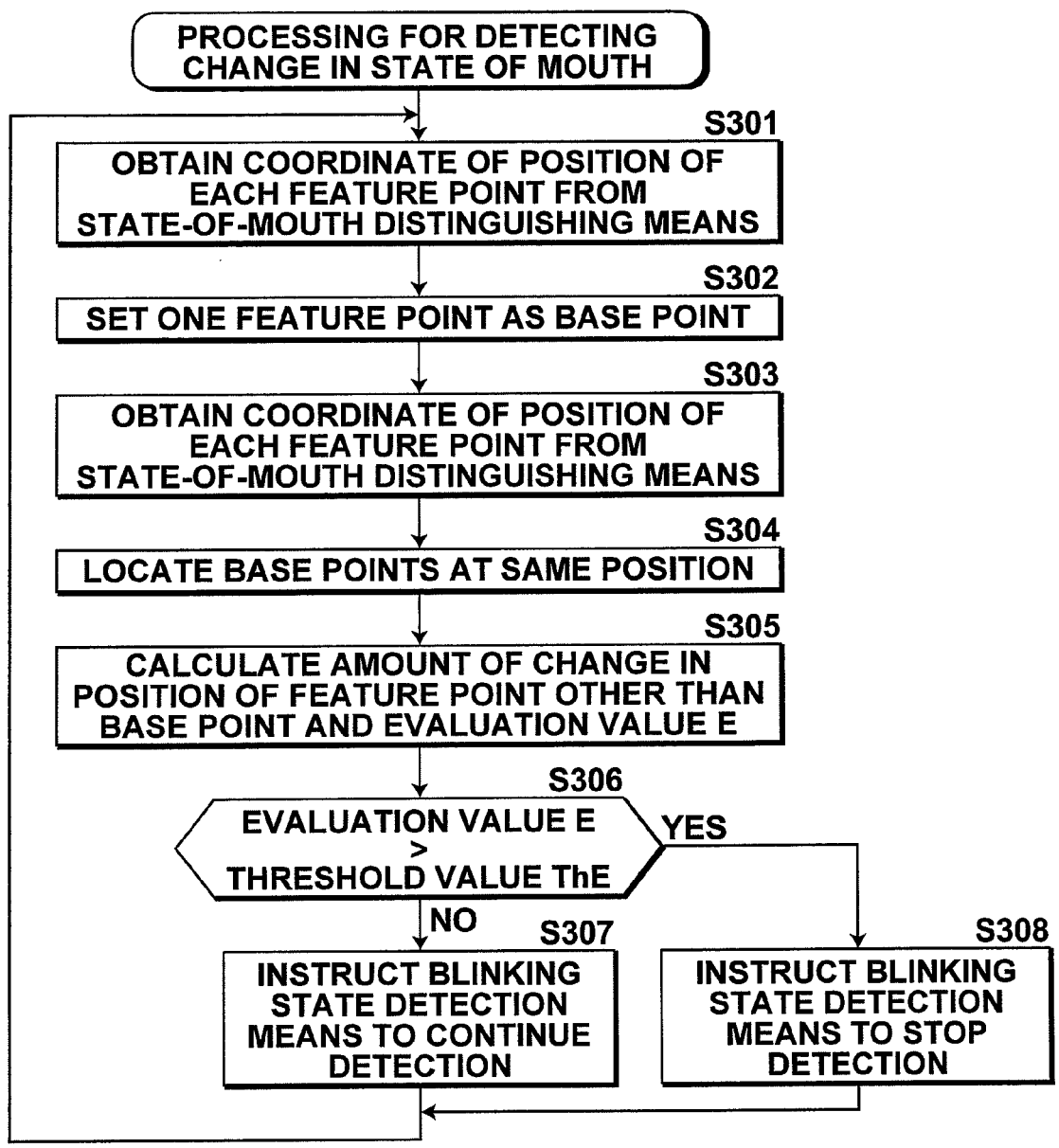
FIG. 11 is a diagram illustrating an example of processing performed by the state-of-mouth change detection means.

FIG. 11 is a flow chart illustrating an example of processing by the state-of-mouth change detection means 56. For example, if an image of a mouth-area in a frame at certain time is an image illustrated in FIG. 1A, the state-of-mouth change detection means 56 obtains the coordinate values (coordinate values in a two-dimensional coordinate system) of the positions L1 through L6 of the feature points F1 through F6 that have been extracted from the image of the mouth-area (step S301). Then, the state-of-mouth change detection means 56 sets one of the feature points F1 through F6 as a base point (standard point) for calculating the amount of change. For example, the feature point F1 is set as the base point (step S302). Then, for example, if the image of the mouth-area in the next frame is an image illustrated in FIG. 10B, the state-of-mouth change detection means 56 obtains the coordinate values of the positions L1' through L6' of the feature points F1 through F6 extracted from the image (step S303).

Then, the state-of-mouth change detection means 56 calculates, based on the obtained coordinate values, a difference between the position L1 of the feature point F1 and the position L1' of the feature point F1. Then, the state-of-mouth change detection means 56 performs coordinate conversion so that the position L1 and the position L1' agree with each other, in other words, so that the positions L1 and L1' are located at the same position. The state-of-mouth change detection means 56 makes the base points in the two frames agree with each other (step S304). Then, the state-of-mouth change detection means 56 calculates the amount of change in position for each of the feature points F2 through F6, which are other than the base point. Further, the state-of-mouth change detection means 56 calculates an evaluation value E of the amount of change for the whole mouth by using a predetermined equation (step S305). The following equation (1) is an example of the equation for obtaining the evaluation value E:

$$E = \sum_{k=2}^{6} (\text{Amount of Change in Position of } Fk)/5. \quad (1)$$

Next, the state-of-mouth change detection means 56 compares the calculated evaluation value E with a predetermined threshold value ThE (step S306). If the evaluation value E is less than or equal to the predetermined threshold value ThE, the state-of-mouth change detection means 56 sends a signal for instructing the blinking state detection means 54 to continue detection of a blinking state (step S307). If the evaluation value E is greater than the predetermined threshold value ThE, the state-of-mouth change detection means 56 judges that the state of the mouth is changing. Then, the state-of-mouth change detection means 56 sends a signal for instructing the blinking state detection means 54 to stop detection of a blinking state (step S308). After then, processing returns to step S303 and the processing in steps S304 through S305 is repeated for the coordinate value obtained in the previous step S303 and the coordinate value obtained in the current step S303.

If a plurality of faces are present, the signals for instructing continuation or stoppage of the blinking state detection processing are sent for each of eyes included in the faces together with an identifier of each of the eyes (step S308). If the blinking state detection means 54 receives a signal for instructing stoppage of processing, the blinking state detection means 54 stops the blinking state detection processing of an eye corresponding to an identifier that has been sent together with the signal. If the blinking state detection means 54 receives a signal for instructing continuation of processing while executing detection processing, the blinking state detection means 54 continues the processing. If the blinking state detection means 54 receives the signal for instructing continuation of processing while stopping processing (while the blinking state detection means 54 is not performing detection processing), the blinking state detection means 54 starts detection again. Accordingly, blinking while the facial expression is changing is not detected as a blinking state.

In the above description, a case in which when a plurality of faces are present, detection of a blinking state is performed on all of the plurality of faces has been illustrated. However, processing for detecting a blinking state may be performed only on a representative face selected by the representative face selecting means 43 of the area extraction unit 28. As illustrated in FIG. 5, representative face information is provided for the state-of-eye distinguishing means 51 and the threshold value setting means 52. Therefore, the state-of-eye distinguishing means 51 can limit the target of processing for distinguishing the state of an eye to the eye or eyes included in the representative face by referring to the representative face information.

Similarly, the threshold value setting means 52 can limit the target of processing for calculating the threshold values Th1 and Th2 to an eye or eyes included in the representative face by referring to the representative face information. If the target of processing is limited to the representative face, it is possible to significantly reduce the amount of calculation carried out by the state distinguishing unit 29. If a blinking state of only a major person needs to be detected, in other words, if it is not necessary to detect a blinking state of any person other than the major person, it is desirable to limit the target of detection to the representative face. Further, it is possible to switch the setting so that the blinking state detection is performed for all of the faces or only for the representative face.

[Utilization of Detection Result]

As described above, the blinking state detection signal output by the blinking state detection means 54 is provided for the image processing unit 25 and the recording/readout control unit 27. The image processing unit 25 utilizes the detection result of the blinking state to generate an image for displaying on a monitor. The recording/readout control unit 27 judges, based on the detection result of the blinking state, whether the image should be recorded in a memory card or not.

If the image processing unit 25 receives a blinking state detection signal, the image processing unit 25 synthesizes a mark image indicating that blinking has been detected in the image data stored in the memory 22. As described above, the blinking state detection signal is output together with an identifier for distinguishing (identifying) each eye. Therefore, the image processing unit 25 identifies (specifies), based on the identifier, an eye (face or person) in which a mark should be provided. Then, the image processing unit 25 synthesizes the image so that the mark image is positioned in the vicinity of the eye. Then, the image data in which the mark image has been synthesized is output at the monitor 6 through the display control unit 26.

Figure 12:
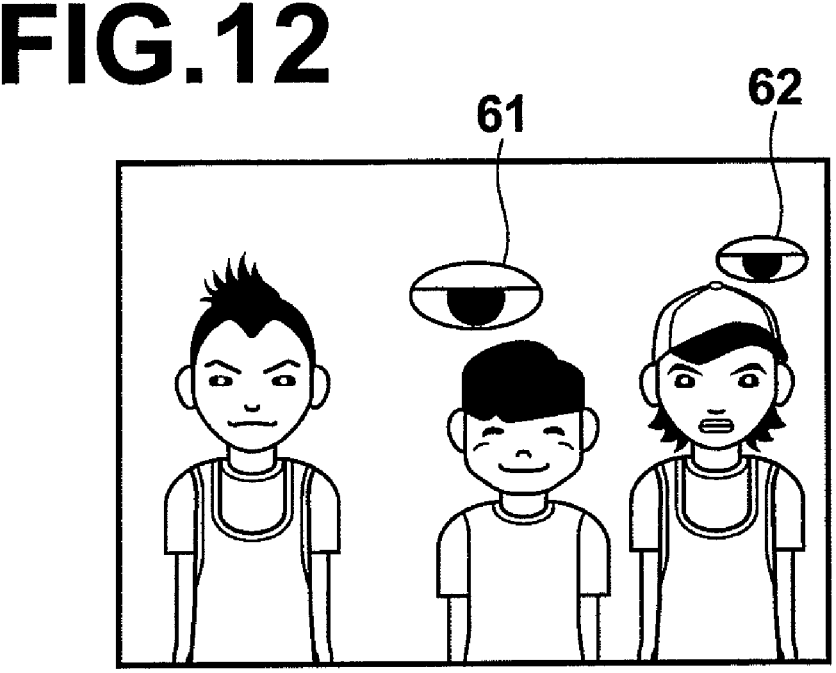
FIG. 12 is a diagram illustrating an example of an image for display that is generated by an image processing unit.

FIG. 12 is a diagram illustrating an example of an image for display, which is generated by the image processing unit 25. The designs or patterns of the mark images 61 and 62 to be synthesized may be arbitrary designs or patterns. However, it is desirable that those who observe the mark images 61 and 62 can easily sense that the mark images represent blinking states. Further, when the mark images are synthesized, the mark images that have the same design or pattern may always be synthesized. Alternatively, a mark image that has a slightly different design or pattern may be formed for each frame. If the mark image is formed in such a manner, the mark image is displayed as an animation image. For example, when a series of frames are present, if an image of an eye in an open state, an image of an eye in a half-open state and an image of an eye in a closed state are synthesized in the frames alternately, an image of a blinking eye can be displayed as an animation image.

Further, if the representative face information is provided, different mark images may be synthesized for a representative face and for faces other than the representative face. In the example illustrated in FIG. 12, a mark image 61, which is substantially larger than a mark image 62 for other faces, is synthesized for the representative face. Alternatively, only the color or design of the mark image for the representative face may be changed from that of the mark image for the other faces.

If an image as illustrated in FIG. 12 is displayed on the monitor 6 in photography mode, a photographer can press the shutter release button 3 so that blinking of a subject is not photographed. Further, if a different mark image is displayed for the representative face, the photographer can press the shutter release button 3 so that blinking of the major subject is not photographed. Further, although the representative face and the other faces are displayed on the monitor so that they are distinguished from each other, the judgment as to whether the representative face should be treated in a special manner or whether the representative face should be treated in a similar manner to the other faces is made by the photographer. Therefore, the photographer can perform photography, based on the condition of the photography place, so that the representative face is treated in an appropriate manner for the condition. Specifically, the photographer can perform photography while paying attention to blinking of only the representative face. Alternatively, the photographer can perform photography while paying attention to blinking of all the faces.

Meanwhile, after the shutter release button 3 is pressed, the recording/readout control unit 27 performs processing by utilizing the detection result of a blinking state. When the blinking state detection function is set to OFF, if the shutter release button 3 is fully pressed, the whole control unit 30 instructs the recording control unit 26 to store the image in the memory card 7. The recording control unit 26, which has received the instruction, reads out image data after image processing from the memory 22 and records the readout image data in the memory card 7. In contrast, when the blinking state detection function is set to ON, if a blinking state has been detected for the image data that has been read out from the memory 22, the recording control unit 26 does not record the image data and reads out the next image data (next frame) from the memory 22. Similar processing is repeated until image data in which no blinking state has been detected is read out. Then, the image data in which no blinking state has been detected is recorded in the memory card 7.

Since blinking is a quick action (movement), even if the photographer looks at a display screen and tries to press the shutter release button 3 so that blinking is not photographed, he/she may actually press the shutter release button 3 while the subject is in a blinking state. If blinking state detection processing is continued after the shutter release button 3 is pressed and timing of recording of the image is controlled based on the detection result of the blinking state, it is possible to always obtain an image that is not in a blinking state. Specifically, it is possible to always obtain images that are not in a blinking state, regardless of the timing of pressing the shutter release button 3.

Other Embodiments

In the aforementioned embodiment, the state-of-eye distinguishing means distinguishes the state by utilizing the value of the height of a pupil in a vertical direction. Alternatively, the state-of-eye distinguishing means may distinguish the state by using a different feature value, such as the area of the white of the eye and the direction of eyelashes, which indicate the state of the eye. Further, in the aforementioned embodiment, the threshold value setting means calculates a threshold value based on the maximum value $h_{max}$ of the height of the pupil in the vertical direction. However, when the state is distinguished by using a feature value that decreases as the eye is more widely open, the threshold value is calculated based on the minimum value hmin of the feature value.

Further, a means for distinguishing a facial component, such as an ear, an eyebrow and a nose, which is other than the mouth, and detecting a change in the state of the facial component may be provided instead of the state-of-mouth distinguishing means and the state-of-mouth change detection means. At the same time, in the present invention, it is not necessary to provide a means for distinguishing the state of a facial component and for detecting a change in the state. Therefore, the present invention may be structured in such a manner that such means for distinguishing the state of a facial component and for detecting a change in the state of the facial component is not provided.

Further, the digital camera in the aforementioned embodiment includes the representative face selecting means. The representative face selecting means does not perform selection of a representative face at some setting but performs selection of the representative face at some other setting. In the present embodiment, it is not always necessary that the representative face selecting means is provided. Therefore, the present invention may be structured in such a manner that no representative face selecting means is provided. Further, the aforementioned embodiment may be modified in various other manners.

Further, the apparatus of the present invention is not limited to the digital camera. A software program for executing processing similar to the processing performed by the area extracting unit 28 and the state distinguishing unit 29 of the digital camera 1 may be installed in an apparatus, such as a personal computer, which does not include an imaging unit. Such an apparatus is another embodiment of the apparatus according to the present invention. In this case, the software program installed in the computer corresponds to an embodiment of the present invention for a software program. Further, a medium, such as a CD-ROM (compact disc read-only memory) and a DVD (digital versatile disc), in which the aforementioned software program has been recorded, corresponds to an embodiment of the present invention for a recording medium.

Figure 13:
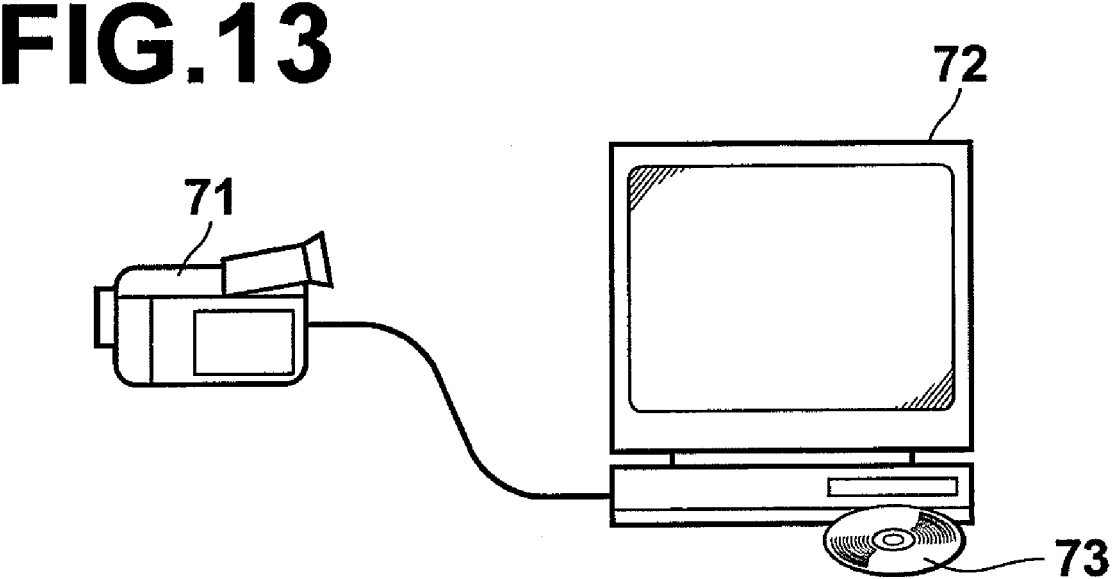
FIG. 13 is a diagram illustrating another embodiment of the present invention.

For example, as illustrated in FIG. 13, a digital video camera 71 and a personal computer 72 (hereinafter, referred to as PC 72) may be connected to each other. Then, the PC 72 may perform, frame by frame, blinking state detection processing on image data generated by the digital video camera 71. Alternatively, the detection of a blinking state may be performed by the digital video camera 71 and the blinking state detection signal may be transferred to the PC 72. Then, display control and record control may be performed on the PC 72 side.

Further, the frame images that are used for detecting a blinking state should be a time series of frame images, but it is not always necessary that the frame images are generated in realtime by photography. Therefore, as another embodiment of the present invention, a moving image data (dynamic image data or video image data) recorded in a medium 73, such as a DVD (digital versatile disc), may be read in the PC 72 to perform the blinking state detection processing.

As described above, the present invention is useful in extracting an image (still image) at a moment when the subject is not blinking from motion image data that has been generated by another apparatus or motion image data that was generated in the past.

What is claimed is:

1. An apparatus for detecting a blinking state, the apparatus comprising:
a state-of-eye distinguishing means for calculating a feature value that represents a state of an eye, for an eye-area which has been detected by searching a frame image, based on pixel data of pixels that constitute the eye-area;

a threshold value setting means for calculating a first threshold value representing the feature value at a first transition point from an open state to a closed state and a second threshold value representing the feature value at a second transition point from the closed state to the open state, based on the feature value calculated for a targeted eye when the targeted eye is open, and storing the calculated first threshold value and the calculated second threshold value in a memory;

a blinking state detection means for detecting the blinking state of the eye corresponding to the eye-area, by sequentially comparing the feature values, which are sequentially calculated for a series of the frame images by the state-of-eye distinguishing means, with one of the first threshold value and the second threshold value, which have been stored in the memory by the threshold value setting means; and a timer which is configured to be set at a predetermined time, wherein said timer is started when a closed eye is detected, wherein the time of the timer is determined when an open eye is detected, and wherein the period of time from the closed eye detection to the open eye detection is compared with a predetermined time set by the timer to determine if the eye is blinking.

2. An apparatus, as defined in claim 1, wherein the threshold value setting means extracts the highest value or the lowest value from a plurality of values, that have been calculated by the state-of-eye distinguishing means for a predetermined number of frame images including the targeted eye, and calculates the first threshold value and the second threshold value by assuming that the extracted value is the feature value when the targeted eye is in the open state.

3. An apparatus, as defined in claim 1, further comprising:
a representative face selecting means for selecting one face-area from face-areas detected by searching the frame images, wherein the threshold value setting means calculates the first threshold value and the second threshold value, regarding only the eye or eyes included in the face-area selected by the representative face selecting means as the targeted eye.

4. An apparatus, as defined in claim 1, further comprising:
a state-of-facial-component distinguishing means for searching frame images for an area representing a facial component other than eyes and distinguishing the state of the facial component based on pixel data of pixels that constitute the area detected by searching; and a state change detection means for detecting a change in the state of the facial component based on the states of the facial component sequentially distinguished by the state-of-facial-component distinguishing means for the series of frame images, wherein the blinking state detection means does not perform detection of a blinking state while the state change detection means is detecting a change in the state of the facial component.

5. An apparatus, as defined in claim 4, wherein the state-of-facial-component distinguishing means calculates the positions of a plurality of feature points of the facial component, and wherein the state change detection means detects a change in the position of each of the feature points in the series of frame images as a change in the state of the facial component.

6. An apparatus, as defined in claim 4, wherein the state-of-facial-component distinguishing means distinguishes the shape of a mouth, and wherein the state change detection means detects a change in the shape of the mouth.

7. An apparatus, as defined in claim 1, wherein the blinking state detection means operates only when the eye-area has been detected.

8. An apparatus, as defined in claim 1, wherein the state-of-eye distinguishing means searches only a search area for the eye-area, wherein the search area for the eye-area is estimated based on a face-area detected by searching the frame images for a face-area.

9. An apparatus, as defined in claim 1, further comprising:
a marking means for generating a mark-synthesized image by synthesizing a mark image representing a detection result obtained by the blinking state detection means in the frame images; and a display control means for outputting the mark-synthesized image generated by the marking means to a predetermined display device.

10. An apparatus, as defined in claim 9, further comprising:
a representative face selecting means for selecting a face-area from face-areas that have been detected by searching the frame images for a face-area, wherein the marking means synthesizes different mark images depending on whether a blinking state of an eye included in the face-area that has been selected by the representative face selecting means has been detected or a blinking state of an eye included in a face-area other than the face-area that has been selected by the representative face selecting means has been detected.

11. An apparatus, as defined in claim 1, further comprising:
a recording control means for determining, based on a detection result output by the blinking state detection means, timing of recording the frame image or images in a predetermined recording medium and recording the frame image or images in the predetermined recording medium at the determined timing.

12. An apparatus, as defined in claim 11, further comprising:
a representative face selecting means for selecting a face-area from face-areas that have been detected by searching the frame images for a face-area, wherein the recording control means determines timing of recording the frame image or images so that the frame image or images are recorded when no blinking state of an eye included in the face-area selected by the representative face selecting means has become detected.

13. An apparatus, as defined in claim 3, wherein the representative face selecting means selects the face-area based on at least one of the position of the face-area, the size of the face-area, the degree of probability that the face-area is a true face-area and the brightness of the face-area.

14. An imaging system comprising:
an apparatus, as defined in claim 1; and
an imaging unit for generating frame images representing a subject and providing the frame images for the apparatus.

15. A method for detecting a blinking state, the method comprising the steps of:
performing state-of-eye distinguishing processing for calculating a feature value that represents a state of an eye, for an eye-area which has been detected by searching a frame image, based on pixel data of pixels that constitute the eye-area;

performing threshold value setting processing for calculating a first threshold value representing the feature value at a first transition point from an open state to a closed state and a second threshold value representing the feature value at a second transition point from the closed state to the open state, based on the feature value calculated for a targeted eye when the targeted eye is open, and storing the calculated first threshold value and the calculated second threshold value in a memory;

performing blinking state detection processing for detecting the blinking state of the eye corresponding to the eye-area, by sequentially comparing the feature values, which have been calculated for a series of the frame images in the state-of-eye distinguishing processing, with one of the first threshold value and the second threshold value, which have been stored in the memory in the threshold value setting processing;

starting a timer when a closed eye is detected;

determining the time of the timer when an open eye is detected; and comparing the determined time from the when the closed eye is detected to when the open eye is detected with a predetermined time set by the timer to determine whether the eye is blinking.

16. A non-transitory computer-readable recording medium having stored thereon a program for detecting a blinking state, the program causing a computer to execute the procedures for:

performing state-of-eye distinguishing processing for calculating a feature value that represents a state of an eye, for an eye-area which has been detected by searching a frame image, based on pixel data of pixels that constitute the eye-area;

performing threshold value setting processing for calculating a first threshold value representing the feature value at a first transition point from an open state to a closed state and a second threshold value representing the feature value at a second transition point from the closed state to the open state, based on the feature value calculated for a targeted eye when the targeted eye is open, and storing the calculated first threshold value and the calculated second threshold value in a memory;

performing blinking state detection processing for detecting the blinking state of the eye corresponding to the eye-area, by sequentially comparing the feature values, which have been calculated for a series of the frame images in the state-of-eye distinguishing processing with one of the first threshold value and the second threshold value, which have been stored in the memory in the threshold value setting processing;

starting a timer when a closed eye is detected;

determining the time of the timer when an open eye is detected; and comparing the determined time from the when the closed eye is detected to when the open eye is detected with a predetermined time set by the timer to determine whether the eye is blinking.

* * * * *